United States Patent [19]

Trapasso

[11] 3,962,161

[45] June 8, 1976

[54] CROSSLINKING OF DIOLEFINIC POLYMERS USING DIACYL NITRILE OXIDES

[75] Inventor: Louis E. Trapasso, Somerset, N.J.

[73] Assignee: Celanese Corporation, New York, N.Y.

[22] Filed: Mar. 17, 1975

[21] Appl. No.: 558,976

[52] U.S. Cl. .................. 260/22 TN; 260/2.5 BB; 260/77.5 R; 260/77.5 CR; 526/12; 526/49; 526/52
[51] Int. Cl.² .................. C08G 18/04; C08G 18/00; C08F 8/00; C08L 91/00
[58] Field of Search ............... 260/77.5 CR, 2.5 BB, 260/77.5 R, 22 TN, 94.7 N

[56] References Cited
UNITED STATES PATENTS

| | | |
|---|---|---|
| 3,294,697 | 12/1966 | LeFevre .................. 260/2.5 BB |
| 3,582,508 | 6/1971 | McIntosh .................. 260/77.5 CR |
| 3,844,993 | 10/1974 | Miller .................. 260/22 TN |
| 3,880,808 | 4/1975 | Hausch et al. .................. 260/77.5 R |

Primary Examiner—H.S. Cockeram

[57] ABSTRACT

A method of crosslinking polymers containing unreacted olefinic groups at room temperature is disclosed. This process involves adding for each mole of olefin group present in the polymer three equivalents of a diisocyanate group-containing compound and one mole of nitromethane. This mixture forms in situ the acyl nitrile oxide group which then reacts with the olefin groups present in the polymer to effect a crosslinking reaction.

9 Claims, No Drawings

CROSSLINKING OF DIOLEFINIC POLYMERS USING DIACYL NITRILE OXIDES

BACKGROUND OF INVENTION

This invention relates to polymeric crosslinking reactions. More particularly, this invention relates to crosslinking reactions which operate at room temperature.

The recent effects of the energy crisis have spurred the search for chemical reactions which do not require external energy. In particular, environmental pollution problems caused by effluent gases which often result when elevated temperatures are utilized to crosslink polymeric materials have also stimulated interest in reactions which may by carried out at essentially room temperature.

In addition, there has been interest shown in recent years in compounds which are curable under ambient conditions for use in the home as sealants and glues. Most prior art sealants and glues have been of the thermoplastic type which provide adhesion simply by the evaporation of a solvent, leaving behind a high molecular weight polymer. These materials have only limited chemical resistance and have been subject to extensive physical breakdown or aging.

Thus, it is an object of this invention to prepare polymeric compositions which are curable at room temperature.

It is another object of this invention to prepare coating compositions which may be applied to a substrate and cured without the application of heat.

It is also an object of this invention to prepare a chemical sealant or glue which is cross-linkable at room temperature and which exhibits improved chemical resistance over prior art thermoplastic sealants and glues.

These and other objectives are obtained by the preparation of the compositions of the instant invention.

SUMMARY OF INVENTION

Basically, the instant invention involves preparing in situ an acyl nitrile oxide in the presence of a polymer containing olefinic unsaturation:

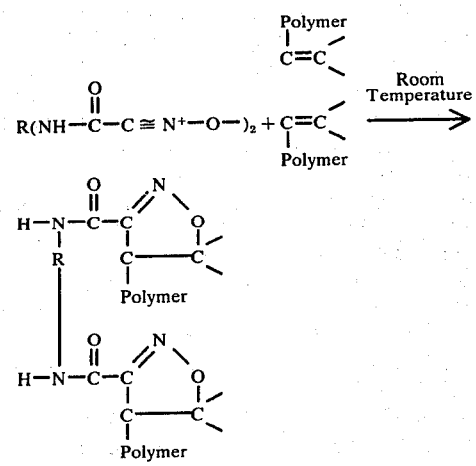

The polyacyl nitrile oxide is prepared by reacting in situ 3 equivalents of a polyisocyanate-containing materials with nitromethane. The three equivalents of isocyanate-containing material may be furnished by a di- or tri-isocyanate. The nitromethane and the isocyanate are added to the polymer desired to be crosslinked so that at least one equivalent of acyl nitrile oxide group is present per olefin group to be reacted.

DESCRIPTION OF INVENTION

The isocyanate materials which may be utilized herein may be di-, tri-, or tetra-functional in nature. In any event, three isocyanate groups must be reacted with each nitromethane group, as described hereafter.

Examples of the di-isocyanates which may be utilized herein include the aromatic di-isocyanates, such as toluene and xylene di-isocyanate, particularly, 2,4-toluene di-isocyanate.

Other di-isocyanates include methylene diphenyl di-isocyanate, aliphatic diisocyanates, such as hexamethylene di-isocyanate, and the like.

The tri-isocyanates are for the most part trimers prepared by trimerizing three moles of a di-isocyanate by methods well known in the art.

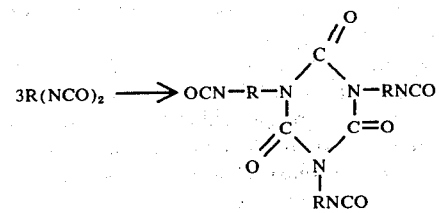

Other tri-isocyanates are formed by reacting di-isocyanates, such as toluene di-isocyanate, with a trihydric alcohol in the presence of a tertiary amine catalyst using known processes. Examples of the trihydric alcohols include glycerine, trimethylolpropane and a trimethylolethane. Of course, di-isocyanates having a different character may be prepared by condensing two moles of a di-isocyanate with one mole of a glycol. Likewise, higher functional alcohols, such as pentaerythritol, may be the basis for forming higher functional polyisocyanates by condensation with a di-isocyanate. However, in most instances the tri-isocyanates are preferred.

The reaction between the isocyanate and the nitromethane is thought to proceed as follows in a three-step concomitant reaction. In the first step the nitromethane adds to the isocyanate:

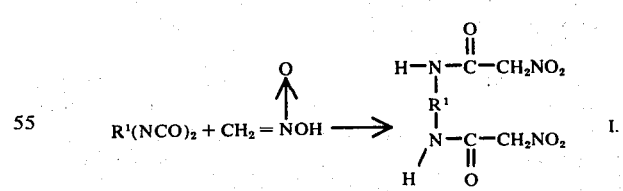

In the second step, the resulting addition product further reacts with another equivalent of the isocyanate to produce an acyl nitrile oxide and an amine:

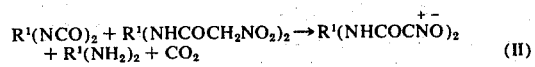

The amine then further reacts with the isocyanate to form a urea.

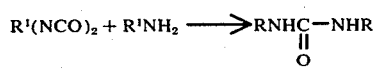    III.

Thus, where a polymer containing unsaturation is utilized, crosslinking may occur by both urea formations and by the reaction with the acyl nitrile oxide which is the main reactive constituent.

The acryl nitrile oxide is prepared in the presence of the polymers described hereinafter by simply blending nitromethane, the polyisocyanate and the polymeric unsaturation containing material.

The acyl nitrile oxide forms an alkyl carbamoyl isooxazoline with the unsaturation present in the polymer. Where materials containing two or three acyl nitrile oxide groups are formed, crosslinking occurs between two polymer chains which each contain residual unsaturation.

In carrying out the reactions of this invention at least one mole of nitromethane and at least three equivalents of polyisocyanate should be blended with each olefin group to be crosslinked.

The polymers which are crosslinked by this reaction contain at least one olefinic bond per molecule and contain no other groups which are interferingly reactive with the acyl nitrile oxide group. The polymers may be of several types. However, polymers containing allyloxy, i.e., vinyl ether groups, are most preferred.

For example, the unsaturation can be present as a substituent attached to a pre-formed polymer resin, such as an alkyd, a polyester, a polyamide, or a vinyl homo- or copolymer. Also included are polymers containing polymeric unsaturated materials prepared by reacting vinyl hydroxy or carboxy materials with polyepoxides, e.g., acrylic acid, with the diglycidyl ether of bisphenol A or polyglycidyl ethers of bisphenol A, as set out hereinafter.

One particularly useful group of polymers which may be crosslinked herein are the polymers prepared from dienes, such as polybutadiene homopolymers which have residual unsaturation remaining after polymerization.

Also included are polymers such as polyvinyl acetate/acrylate, wherein pendant hydroxy groups on the polyvinyl acetate/polyvinyl alcohol copolymer have been reacted with, for example, acrylic acid. Similarly, included are polymers such as cellulose acetate/acrylate, cellulose acetate/methacrylate, N,acryloxy methylpolyamide, N,methacryloxy methylpolyamide, allyloxy methylpolyamide, etc.

The polymers which may furnish pendant unsaturation useful for crosslinking in the instant invention include polymers containing either pendant hydroxy or pendant carboxy groups, which groups have been reacted respectivley with alpha beta ethylenically unsaturated vinyl polymerizable hydroxy or carboxycontaining materials, utilizing an esterification catalyst, such as a metal oxide, metal hydroxide, metal chelate, metal carboxylate, and the like. Examples include tetraisopropyl titanate, zinc oxide, lead oleate, as well as various anionic exchange resins.

The hydroxy-containing polymerizable monomers include for the most part glycol or monoepoxide esters of alpha beta ethylenically unsaturated vinyl polymerizable acids. Examples of such acids include acrylic, methacrylic, ethacrylic, crotonic and itaconic acids, and the like.

Hydroxy monomers can have the general formula

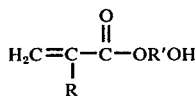

wherein R is hydrogen or methyl and R' is $C_1$–$C_{12}$ hydroxy alkyl. Examples of such hydroxy monomers include hydroxyethyl acrylate or methacrylate hydroxypropyl acrylate or methacrylate, hydroxyhexyl acrylate or methacrylate, and the like.

Examples of the polymers which may furnish the aliphatic hydroxy or carboxy groups which may be further coreacted to produce the pendant unsaturation-containing polymers include polymers prepared from alpha beta ethylenically unsaturated monomers containing an alpha beta ethylenically unsaturated, aliphatic, hydroxy-containing monomer, with the remainder of the polymer being formed of vinyl monomers copolymerizable therewith. Examples of the monomers include allyl and methallyl alcohol, hydroxy alkyl esters of polymerizable acids, including the beta hydroxy alkyl esters of acrylic acid, methacrylic acid, crotonic acid, itaconic acid, and the like. The preferred hydroxy alkyl esters are those which contain 2 to 4 carbon atoms in the alkyl group. Examples of these esters are beta hydroxy ethyl acrylate, beta hydroxy ethyl methacrylate, beta hydroxy propylacrylate, beta hydroxy propyl methacrylate, beta hydroxy butyl crotonate, beta hydroxy propyl maleate, beta hydroxy ethyl fumarate, and the like. Beta hydroxy alkyl esters can generally be prepared by reacting a monoepoxide-containing compound with a polymerizable, alpha beta ethylenically unsaturated acid. Examples of such monoepoxides are ethylene oxide, 1,2-propylene oxide, 1,2-butylene oxide, 2,3-butylene oxide, styrene oxide, phenyl glycidyl ether, butyl glycidyl ether, and the like. Most preferred of the hydroxy-containing monomers are beta hydroxy ethyl acrylate and beta hydroxy propyl acrylate.

In addition to the hydroxy monomer, other types of ethylenically unsaturated monomers which are copolymerizable therewith may be employed. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms, as well as the polymerizable acids themselves.

Acrylonitrile, methacrylonitrile, acrylamide, methacrylamide, methylstyrene, allyl acetate, glycidyl methacrylate, t-butylaminnoethylmethacrylate, vinyl pyrrolidone, N,N-dimethylaminoethylmethacrylate, ethylene, propylene, vinyl chloride, vinyl fluoride, vinylidene fluoride, hexafluoropropylene, chlorotrifluoroethylene, and tetrafluoroethylene can also be used as the monomers herein.

Generally, the hydroxy monomers should be added on a weight basis, so that they comprise about 10 to about 50 percent, by weight, of the monomers utilized, preferably about 20 to about 30 percent.

A preferred type of hydroxy-containing copolymer is prepared by copolymerizing styrene and allyl or methallyl alcohol in the range of about 70 to 75 percent, by weight, styrene, the remainder being allyl alcohol, or methallyl alcohol.

Generally any of the varied methods of vinyl polymerization can be utilized in preparing the hydroxy-containing polymers of the instant invention. Preferably, the various polymerization initiators are utilized to effect polymerization. Examples of such initiators include organic peroxides, such as tertiary butyl hydroperoxide, ditertiary butyl peroxide, cumene hydroperoxide, dicumyl peroxide, benzoyl peroxide, and the like. Equally suitable are organic peroxygen compounds, such as tertiary butyl peroxide acetate, tertiary butyl perbenzoate, ditertiary butyl diperthalate and the like. Other initiators include azodiisobutyronitrile (AIBN), ultraviolet light, gamma radiation, etc.

The polymers of the instant invention may be prepared by a bulk polymerization process or by adding the above-descrbed monomers to the reaction medium over a period ranging from 30 minutes to 10 to 12 hours. The polymerization initiator may be added to the reaction flask or may be mixed with the monomer, or separately added, depending upon the desired final product. Reaction temperatures may vary from 70° to 80° C. up to about 180° to 220° C. or higher, again depending upon the various desired end products and the monomers utilized.

The vinyl hydroxy polymers of the instant invention may be prepared in virtually any solvent in which the final polymer is soluble and which is not interferingly reactive with either the final product, the initiators or the monomers utilized. Examples of the solvents which may be utilized include, but are not limited to, the various alcohols, ester alcohols, ether alcohols, esters, and the like. In addition, minor amounts of petroleum-based solvents, such as mineral spirits, naphthas, and the like, may be utilized, as well as other solvents, such as xylene, toluene, benzene, and the like.

Where alcohol or ester-containing solvents are utilized, these solvents must be removed prior to the esterification reaction herein.

Instead of utilizing the vinyl hydroxy-containing or carboxy-containing polymers described above, so-called alkyd resins may be utilized, as long as they contain at least about 20 percent, by weight, or an unsaturated oil or fatty acid.

The methods for preparing these resins are well known in the art. In general, two basic methods are used. In the first a fatty acid is reacted with a mixture of polyols and polybasic acids, such as glycerine and phthalic anhydride. The second method commonly used entails the alcoholysis of a fatty oil, such as coconut oil, with a polyol, such as pentaerythritol, and the further condensation of this reaction product with polyols and polybasic acids as above.

Included among the various fatty acids and oils useful in preparing these alkyd resins are the fatty acids derived from the following oils: castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4-butanediol, hexylene glycol, 1,6-hexanediol, the polyglycols, such as diethylene glycol or triethylene glycol, etc., the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids, such as rosin acids, benzoic acid, paratertiary butyl benzoic acid and the like; the polyfunctional acids, such as adipic acid, azelaic acid, sebacic acid, phthalic acid or anhydride, isophthalic acid, terephthalic acid, dimerized and polymerized fatty acids, trimellitic acid, and the like. (It should be noted that alkyds prepared from at least about 20 weight percent unsaturated acid or fatty acid may be crosslinked as-is without further modification.)

Other types of polymeric materials which may be utilized to furnish either the carboxyl or hydroxy-containing polymer useful herein are the so-called epoxy resins, and more particularly, the epoxy resin esters. The epoxy resins are basically polyglycidyl ethers of polyhydric phenols obtained by reacting a polyhydric phenol in excess epihalohydrin with sodium hydroxide. Examples of the polyhydric phenols include bisphenol A (p,p'-dihydroxy diphenylpropane), resorcinol, hydroquinone, 4,4'-dihydroxy benzophenone, bis(4-hydroxyphenyl)ethane, 1,5-dihydroxy naphthalene, 4,4'-dihydroxy biphenyl, and the like.

Other glycidyl ethers of polyhydric phenols are polymers prepared by reacting 1.1 up to about 2 moles of epichlorohydrin with 1 mole of dihydric phenol or by reacting polyepoxides with added polyhydric phenol.

Additional epoxide resins are glycidyl ethers of polyhydric alcohols, prepared by reacting a polyhydric alcohol in epichlorohydrin with an acid catalyst, such as boron trifluoride, and subsequently reacting the resulting product with an alkaline dehydrohalogenating agent. Included among the polyhydric alcohols which can be used in the preparation of these polyepoxides are ethylene glycol, pentaerythritol, propylene glycol, diethylene glycol, hexanediol, trimethylol ethane, trimethylol propane, and the like.

The polyepoxides after they have been prepared as described above are then reacted with either an unsaturated carboxylic acid or alcohol.

Yet another type of polymer useful herein in furnishing the hydroxy-containing base material is prepared by reacting an epoxide-containing monomer as described above, e.g., propylene oxide or ethylene oxide, with a polyol containing at least three hydroxyl groups per molecule. Examples of such polyols include glycerine, pentaerythritol, the polymers of pentaerythritol, trimethylolpropane, trimethylolethane, and the like.

Another method of obtaining carboxylic acid-containing polymers, is by reacting an hydroxy-containing polymer with a carboxylic acid anhydride, such as phthalic anhydride, trimellitic anhydride, succinic anhydride, and the like. Thus, the anhydride is simply mixed into the desired polymer and the polymer heated to just above the melting point of the anhydride. The anhydride ring is then opened by co-reaction between the pendant hydroxy groups and the anhydride, and there results a half-ester reaction, producing a polymer having pendant carboxylic acid groups.

After the pendant hydroxy or carboxy-containing material has been prepared, it is co-reacted with vinyl hydroxy or vinyl carboxy monomers, as the case may be, in the presence of an esterification catalyst (previously described) at temperatures ranging up to about 400° F., generally in the presence of a polymerization inhibitor. Examples of such inhibitors include the quinones, such as hydroquinone, the various phenols, p-tert-butyl-catechol, p-methoxyphenyl, 2,4-dichloro-6-nitrophenol, n-propyl gallate, di-tert-butyl-p-cresol, 2,2'-methylenebis(4-methyl-6-tert-butylphenol), 1-amino-7-naphthol, p-benzoquinone, 2,6-dichloro-p-benzoquinone, 2-amino-1,4-naphthoquinone, 3-aminoanthraquinone, diphenylamine, p-nitrosodimethylaniline, α and β -naphthylamine, phenothiazine, N-nitrosodimethylamine, hexamethylphosphoramide, n-dodecyl metcaptan, benzenethiol, 2,2-diphenyl-1-picrylhydrazyl (phenyl hydrazine), divinylacetylene, and various antimony and copper salts. The inhibitors should be added to the reaction mixture in the range of about 50–1000 parts per million parts by weight of reactant, preferably about 100–400 ppm.

Where an inhibitor is used, it is preferred that it be activated by continuously sparging the reaction mixture with a nitrogen/oxygen sparge, preferably containing about 5 to about 50 percent, by volume of oxygen.

Instead of directly esterifying the hydroxy or carboxy-containing polymer, it may be reacted with an unsaturated epoxide such as glycidyl acrylate or methacrylate to form the unsaturation-containing polymer.

The compositions of the instant invention may be used as protective coatings. In addition, they may be utilized as sealants, glues, adhesives, and the like.

The compositions of the instant invention may be compounded with fillers, pigments, reinforcing aids, and other polymeric materials which are compatible with the system. Generally, the olefinic-containing polymer is compounded with the aforementioned products and the nitromethane and the diisocyanate are added subsequent thereto immediately before use.

In the following examples, all parts and percentages are by weight, unless otherwise specified.

EXAMPLE 1

Into a reaction vessel were added 20 parts of Hystl resin B2000, a polybutadiene resin available from the Dynachem Corporation, having a theoretical structure of

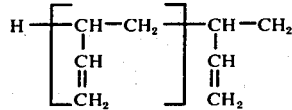

a molecular weight of 2000±200, a pour point of 8° C., and a 45° C. viscosity of 30–140 poises, 17.4 parts of toluene diisocyanate and 12.2 parts of nitromethane. The materials were mixed and about 0.3 parts of triethylamine were added. After 24 hours of reaction, an orange solid rubber resulted, which was useful as a protective sealant.

EXAMPLE 2

Into a reactor equipped with a mechanical agitator, and reflux condenser, were added 1 mole of triethylene glycol and 4 moles of phthallic anhydride. The contents were heated to 120° C. and 4 moles of glycidyl methacrylate were added to the mixture over about 3 hours. The contents were held to an acid value of 5.7 and the reaction stopped. The resulting product had a weight per double bond of 330 and was reduced to 70 percent solids in xylene.

50 parts of the reduced material were mixed with 69.5 parts of the reaction product of 3 moles of toluene diisocyanate and 1 mole of trimethylol propane, 2.3 parts of nitromethane and 1.5 parts of triethylamine. The mixture was drawn down on a steel panel to a thickness of 0.005 inches. Ten minutes after drawdown the mixture was slightly tacky. 8 hours later it was tackfree.

EXAMPLE 3

50 parts of the 70% solids polyester solution prepared in Example 2 were mixed with 27.67 parts of toluene diisocyanate, 6.3 parts of nitromethane, and 1.5 parts of triethylamine. The material was drawn down on steel panels to a thickness of 0.005 inches and was slightly tacky after 12 minutes. 8 hours later the panels were tack free.

What is claimed is:

1. A process for crosslinking an olefinic group-containing polymer, which comprises blending with said polymer at least one mole of nitromethane and at least three equivalents of a polyisocyanate for each olefinic group to be crosslinked, and allowing the mixture to react.

2. The process of claim 1 wherein the polyisocyanate is a tri-isocyanate.

3. The process of claim 2 wherein the triisocyanate is prepared by trimerizing an aromatic di-isocyanate.

4. The process of claim 3 wherein the aromatic di-isocyanate is 2,4-toluene di-isocyanate.

5. The process of claim 2 wherein the tri-isocyanate is prepared by reacting a trihydric alcohol and a di-isocyanate.

6. The process of claim 5 wherein the tri-hydric alcohol is trimethylolpropane and the diisocyanate is 2,4-toluene diisocyanate.

7. The process of claim 1 wherein the polymer/containing olefinic unsaturation is a polyester resin onto which has been esterified an acrylic or methacrylic group.

8. The process of claim 1 wherein the unsaturated material is an alkyd resin containing at least about 20 percent by weight of an unsaturated fatty acid or oil.

9. The product prepared by the process of claim 1.

* * * * *